(12) United States Patent
Miyagawa

(10) Patent No.: US 8,995,065 B2
(45) Date of Patent: Mar. 31, 2015

(54) IMAGING LENS AND IMAGING APPARATUS

(75) Inventor: Naoki Miyagawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 13/445,566

(22) Filed: Apr. 12, 2012

(65) Prior Publication Data

US 2012/0314305 A1 Dec. 13, 2012

(30) Foreign Application Priority Data

Jun. 7, 2011 (JP) ................... 2011-127601

(51) Int. Cl.
*G02B 9/12* (2006.01)
*G02B 13/04* (2006.01)

(52) U.S. Cl.
CPC ...................................... *G02B 13/04* (2013.01)
USPC .......................................................... 359/784

(58) Field of Classification Search
CPC ...... G02B 13/00; G02B 21/02; G02B 15/177; G02B 15/173; G02B 5/005; G02B 23/243; G02B 13/04; G02B 13/24; G02B 13/02
USPC ................. 359/735, 749–754, 756, 791, 648, 359/689–690, 739, 761, 784
See application file for complete search history.

(56) References Cited

U.S. PATENT DOCUMENTS

| | | | | | |
|---|---|---|---|---|---|
| 4,773,744 | A | * | 9/1988 | Yamanashi | 359/689 |
| 7,173,770 | B2 | * | 2/2007 | Kashiki | 359/689 |
| 7,777,974 | B2 | * | 8/2010 | Yamamoto | 359/791 |
| 2011/0304929 | A1 | * | 12/2011 | Tsutsumi | 359/784 |
| 2012/0075729 | A1 | * | 3/2012 | Uemura | 359/784 |

FOREIGN PATENT DOCUMENTS

| | | |
|---|---|---|
| JP | 2009-145587 | 7/2009 |
| JP | 2009-210910 | 9/2009 |

* cited by examiner

*Primary Examiner* — Thomas K Pham
*Assistant Examiner* — Jie Lei
(74) *Attorney, Agent, or Firm* — Rader, Fishman & Grauer PLLC

(57) ABSTRACT

An imaging lens includes: a first lens group; a second lens group having positive refractive power; and a third lens group having negative refractive power, which are arranged in order from an object side, wherein the first lens group includes a front lens group having a negative lens in a most object side, a diaphragm, and a rear lens group having positive refractive power, wherein the second lens group includes a first lens having negative refractive power, a second lens having positive refractive power, and a third lens having positive refractive power in an order from the object side, and wherein, when focusing is performed, the second lens group is moved in an optical axis direction.

12 Claims, 9 Drawing Sheets

EMBODIMENT 1

EMBODIMENT 2

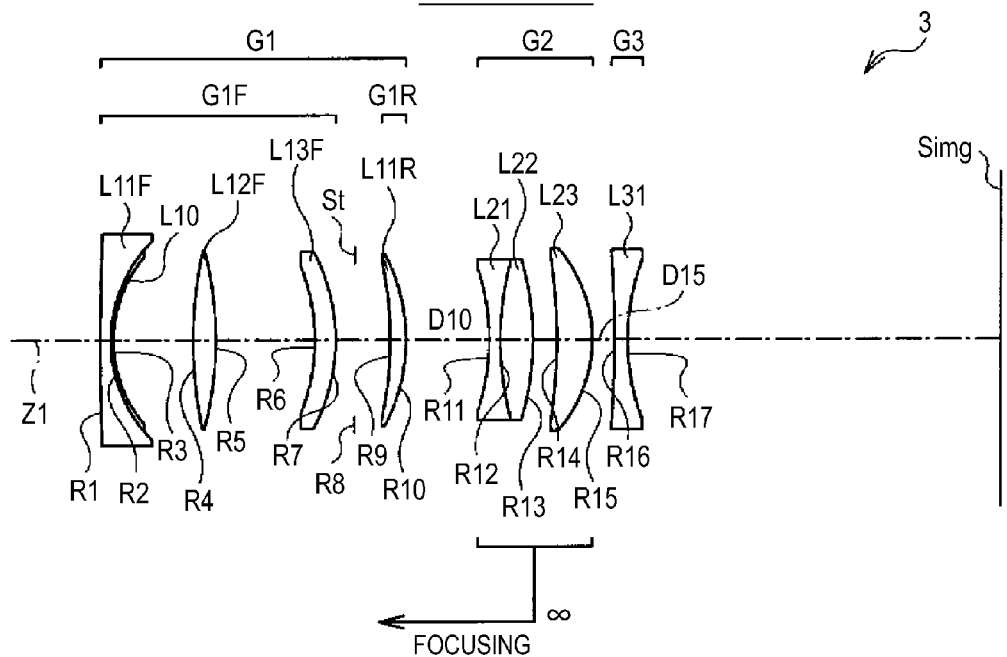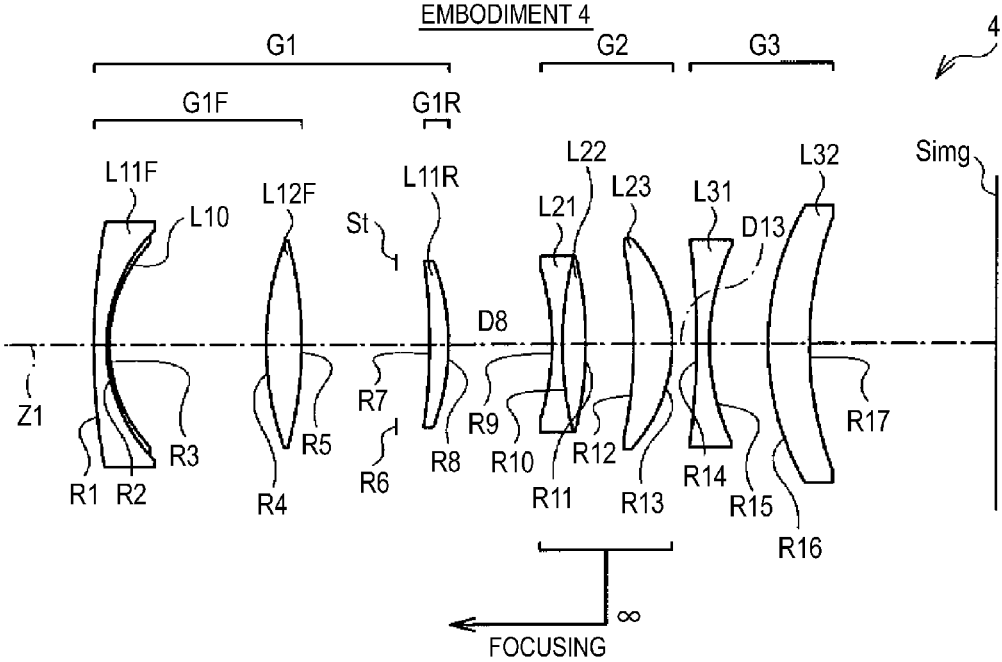

EMBODIMENT 5

EMBODIMENT 1 · INFINITE FOCUSING

Fno.=3.59

—— d
----- g
—·—· c

-0.50 -0.25 0.0 0.25 0.50 (mm)
SPHERICAL
ABERRATION

ω=25.46°

—— S
—·— M

-0.50 -0.25 0.0 0.25 0.50 (mm)
ASTIGMATISM

ω=25.46°

-5.00 -2.50 0.0 2.50 5.00 [%]
DISTORTION

EMBODIMENT 1 · FOCUSING AT CLOSE RANGE

Fno.=4.61

-0.50 -0.25 0.0 0.25 0.50 (mm)

SPHERICAL ABERRATION

ω=25.26°

-0.50 -0.25 0.0 0.25 0.50 (mm)

ASTIGMATISM

ω=25.26°

-5.00 -2.50 0.0 2.50 5.00
[%]

DISTORTION

EMBODIMENT 2 · INFINITE FOCUSING

Fno.=3.56

-0.50 -0.25 0.0 0.25 0.50 (mm)

SPHERICAL ABERRATION

ω=25.50°

-0.50 -0.25 0.0 0.25 0.50 (mm)

ASTIGMATISM

ω=25.50°

-5.00 -2.50 0.0 2.50 5.00
[%]

DISTORTION

EMBODIMENT 2 · FOCUSING AT CLOSE RANGE

Fno.=3.71

-0.50 -0.25 0.0 0.25 0.50 (mm)
SPHERICAL ABERRATION

ω=25.46°

-0.50 -0.25 0.0 0.25 0.50 (mm)
ASTIGMATISM

ω=25.46°

-5.00 -2.50 0.0 2.50 5.00 [%]
DISTORTION

EMBODIMENT 3 · INFINITE FOCUSING

Fno.=3.59

-0.50 -0.25 0.0 0.25 0.50 (mm)
SPHERICAL ABERRATION

ω=25.59°

-0.50 -0.25 0.0 0.25 0.50 (mm)
ASTIGMATISM

ω=25.59°

-5.00 -2.50 0.0 2.50 5.00 [%]
DISTORTION

EMBODIMENT 3 · FOCUSING AT CLOSE RANGE

Fno.=4.53
—— d
---- g
—·— c
-0.50 -0.25 0.0 0.25 0.50 (mm)
SPHERICAL ABERRATION

ω=25.48°
—— S
—·— M
-0.50 -0.25 0.0 0.25 0.50 (mm)
ASTIGMATISM

ω=25.48°
-5.00 -2.50 0.0 2.50 5.00 [%]
DISTORTION

EMBODIMENT 4 · INFINITE FOCUSING

Fno.=3.60
—— d
---- g
—·— c
-0.50 -0.25 0.0 0.25 0.50 (mm)
SPHERICAL ABERRATION

ω=25.50°
—— S
—·— M
-0.50 -0.25 0.0 0.25 0.50 (mm)
ASTIGMATISM

ω=25.50°
-5.00 -2.50 0.0 2.50 5.00 [%]
DISTORTION

EMBODIMENT 4 · FOCUSING AT CLOSE RANGE

Fno.=3.82

-0.50 -0.25 0.0 0.25 0.50 (mm)

SPHERICAL ABERRATION

— d
--- g
-·- c

ω=25.64°

-0.50 -0.25 0.0 0.25 0.50 (mm)

ASTIGMATISM

— S
-·- M

ω=25.64°

-5.00 -2.50 0.0 2.50 5.00 [%]

DISTORTION

EMBODIMENT 5 · INFINITE FOCUSING

Fno.=2.88

-0.50 -0.25 0.0 0.25 0.50 (mm)

SPHERICAL ABERRATION

— d
--- g
-·- c

ω=25.85°

-0.50 -0.25 0.0 0.25 0.50 (mm)

ASTIGMATISM

— S
-·- M

ω=25.85°

-5.00 -2.50 0.0 2.50 5.00 [%]

DISTORTION

EMBODIMENT 5 · FOCUSING AT CLOSE RANGE

SPHERICAL ABERRATION

ASTIGMATISM

DISTORTION

IMAGING LENS AND IMAGING APPARATUS

FIELD

The present disclosure relates to a bright imaging lens system which has a photographing view angle with reference range and an F-number of about 3.5 or less, and in particular, to an imaging lens which is used in an interchangeable lens device of a so-called interchangeable lens digital camera, and an imaging apparatus provided with the imaging lens.

BACKGROUND

Although there are several types of bright macro lenses having a photographing view angle in a reference range and an F-number of about 3.5 or less for an interchangeable lens camera system, Gaussian-type lenses are widely known. In a macro lens, since it is desired that aberration correction is appropriately performed from the distance of closest approach to infinity, so-called a floating mechanism which causes at least two lens groups to be independently moved in order to perform focusing has been frequently used (refer to JP-A-2009-145587). In addition, other than the Gauss-type lens, a lens system has been proposed in which a first lens group having positive refractive power and a second lens group having negative refractive power are included, and the first lens group is moved in the optical axis direction when focusing is performed (for example, refer to JP-A-2009-210910).

SUMMARY

Recently, interchangeable lens digital cameras have rapidly become widespread. Particularly, since moving images can be captured in an interchangeable lens camera system, there is a demand for a lens that is suitable not only for capturing a still image but also for capturing moving images. When a moving image is captured, it is necessary to move a lens group that performs focusing at high speed so as to follow rapid movement of a subject. With regard to the bright macro lens which has a photographing view angle in a reference range and an F-number of about 3.5 or less, there is a demand to perform focusing at high speed so as to handle the capturing of moving images.

In JP-A-2009-145587, the Gaussian-type lens has been proposed. When focusing is performed, parts of a front lens group and a rear lens group that have a diaphragm interposed therebetween are independently moved in the optical axis direction. However, when attempting to perform focusing by moving the whole lens system at high speed for photographing a moving image, the weight of the focusing lens group is heavy, so that the size of an actuator used for moving the lenses becomes large. Accordingly, there is a problem in that the size of a lens barrel becomes large. In addition, when attempting to perform focusing at high speed by independently moving the front group and the rear group, a plurality of actuators are built into a lens barrel, whereby there is a problem in that the size of the lens barrel becomes large.

In an imaging lens disclosed in JP-A-2009-210910, a first lens group is moved in the optical axis direction when focusing is performed. When attempting to perform focusing at high speed for capturing moving images, since the weight of the first lens group is heavy, the size of a driving actuator becomes large, so that the size of the lens barrel becomes large.

It is therefore desirable to provide an imaging lens, which is compact and is capable of performing focusing at high speed, and an imaging apparatus.

An embodiment of the present disclosure is directed to an imaging lens including a first lens group; a second lens group having positive refractive power; and a third lens group having negative refractive power, which are arranged in order from an object side. The first lens group includes a front lens group having a negative lens in the most object side, a diaphragm, and a rear lens group having positive refractive power. The second lens group includes a first lens having negative refractive power, a second lens having positive refractive power, and a third lens having positive refractive power in an order from the object side. In addition, when focusing is performed, the second lens group is moved in the optical axis direction.

Another embodiment of the present disclosure is directed to an imaging apparatus including an imaging lens; and an imaging device which outputs an imaging signal based on an optical image formed by the imaging lens. The imaging lens is configured using the imaging lens according to the embodiment of the present disclosure.

In the imaging lens or the imaging apparatus according to the embodiment of the present disclosure, the second lens group from among the three lens groups is moved in the optical axis direction when focusing is performed.

In the imaging lens or the imaging apparatus according to the embodiment of the present disclosure, the second lens group from among the three lens groups is moved in the optical axis direction when focusing is performed, so that it is compact and focusing can be performed at high speed.

BRIEF DESCRIPTION OF THE DRAWINGS

FIG. 3 is a cross-sectional view illustrating a third configuration example of the imaging lens, and illustrating a lens corresponding to a third numerical embodiment;

FIG. 4 is a cross-sectional view illustrating a fourth configuration example of the imaging lens, and illustrating a lens corresponding to a fourth numerical embodiment;

DETAILED DESCRIPTION

Hereinafter, embodiments according to the present disclosure will be described in detail with reference to the accompanying drawings.

[Lens Configuration]

Figure 1:
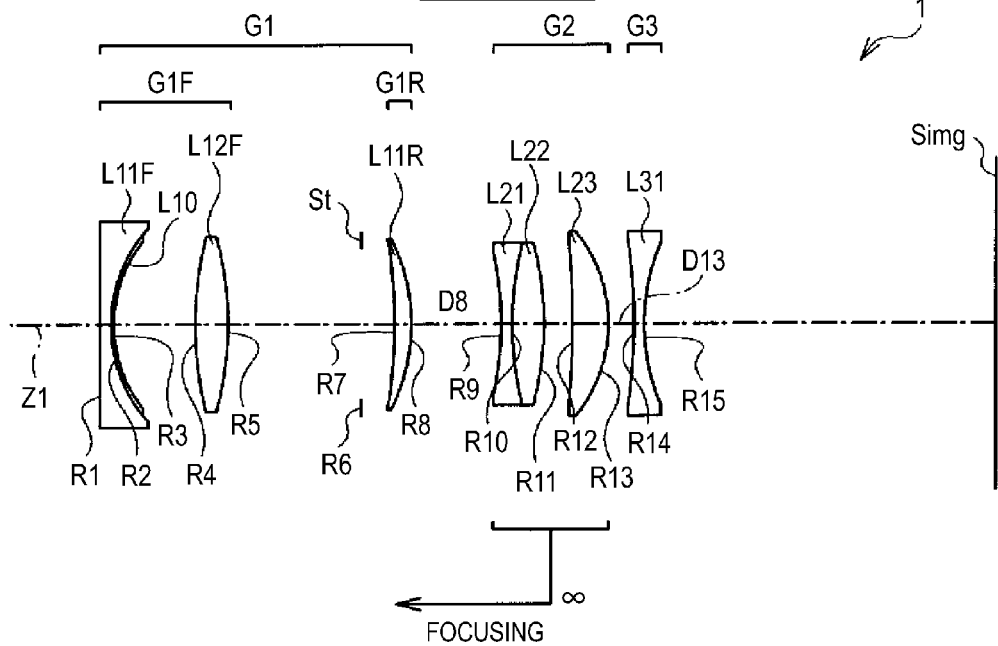
FIG. 1 is a cross-sectional view illustrating a first configuration example of an imaging lens according to an embodiment of the present disclosure, and illustrating a lens corresponding to a first numerical embodiment.

FIG. 1 illustrates a first configuration example of an imaging lens according to an embodiment of the present disclosure. This configuration example corresponds to a lens configuration according to a first numerical embodiment which will be described later. Meanwhile, FIG. 1 corresponds to lens arrangement when infinite focusing is performed. In the same manner, FIGS. 2 to 5 illustrate cross-sectional configurations according to second to fifth configuration examples which correspond to lens configurations according to second to fifth numerical embodiments which will be described later. In FIGS. 1 to 5, reference symbol "Ri" represents the curvature radius of an i-th surface in which reference symbol is assigned in such a way that the surface of a component in the most object side is designated as a first surface and the reference symbol sequentially increases toward an image side (focal side). Reference symbol "Di" represents the surface separation between the i-th surface and an (i+1)-th surface on an optical axis Z1. Meanwhile, with regard to the reference symbol "Di", reference symbol is assigned only to the surface separations (for example, D8 and D13 in FIG. 1) of the part which varies in association with focusing. Reference symbol "Simg" indicates an image surface.

The imaging lens according to the present embodiment substantially includes three lens groups in order from an object side along the optical axis Z1, that is, a first lens group G1, a second lens group G2 having positive refractive power, and a third lens group G3 having negative refractive power. The first lens group G1 includes a front lens group G1F, a diaphragm St, and a rear lens group G1R. When focusing is performed, the second lens group G2 is moved in the optical axis direction. The first lens group G1 and the third lens group G3 are fixed when focusing is performed.

It is preferable that the diaphragm St (opening diaphragm) be disposed in the position which is adjacent to the rear lens group G1R of the first lens group G1. As a specific configuration example, the diaphragm St is disposed between the front lens group G1F and the rear lens group G1R of the first lens group G1 in any of the imaging lenses 1 to 5 according to the first to fifth configuration examples.

In the first lens group G1, the front lens group G1F includes a negative lens in the most object side. As the specific configuration example, a first lens L11F in the most object side of the front lens group G1F corresponds to a negative lens in any of the imaging lenses 1 to 5 according to the first to fifth configuration examples.

The front lens group G1F can be configured using, for example, two or three lenses. As a specific configuration example, in the imaging lenses 1, 4, and 5 according to the first, fourth, and fifth configuration examples, the front lens group G1F includes two lenses in order from the object side, that is, a first lens L11F and a second lens L12F. Further, in the imaging lenses 2 and 3 according to second and third configuration examples, the front lens group G1F includes three lenses in order from the object side, that is, the first lens L11F, the second lens L12F, and a third lens L13F. In particular, in the imaging lens 2 according to the second configuration example, configuration is made such that the first lens L11F corresponds to a negative lens, the second lens L12F corresponds to a positive lens, and the third lens L13F corresponds to a negative lens in order from the object side. The second lens L12F and the third lens L13F configure a cemented lens. Further, in the imaging lens 3 according to the third configuration example, configuration is made such that the first lens L11F corresponds to a negative lens, the second lens L12F corresponds to a positive lens, and the third lens L13F corresponds to a positive lens in order from the object side.

The rear lens group G1R has positive refractive power. As a specific configuration example, in any of the imaging lenses 1 to 5 according to the first to fifth configuration examples, the rear lens group G1R includes a positive meniscus lens L11R which faces a concave surface to the object side.

The second lens group G2 includes a first lens L21 having negative refractive power, a second lens L22 having positive refractive power, and a third lens L23 having positive refractive power. In any of the imaging lenses 1 to 5 according to the first to fifth configuration examples, the second lens group G2 is configured as described above.

The third lens group G3 can include, for example, one or two lenses. As a specific configuration example, in the imaging lenses 1 to 3 according to the first to third configuration examples, the third lens group G3 includes one negative lens L31. Further, in the imaging lenses 4 and 5 according to the fourth and fifth configuration examples, third lens group G3 includes two lenses, for example, the negative lens L31 and a positive lens L32 in order from the object side.

It is preferable that the imaging lens according to the present embodiment be configured such that the following Conditional Equation is appropriately and selectively satisfied.

$$1 < f1R/f < 5 \tag{1}$$

$$0.2 < \beta2 < 0.7 \tag{2}$$

$$1.5 < \beta 3 < 3.1 \tag{3}$$

$$Nd21 < 1.7 \tag{4}$$

$$Nd22 < 1.75 \tag{5}$$

$$Nd23 < 1.75 \tag{6}$$

$$-10 < G1Rr/f < -0.7 \tag{7}$$

$$-1.4 < f3/f < -0.5 \tag{8}$$

wherein f1R: the focal length of the rear lens group G1R,
f: the focal length of the whole lens system,
β2: the lateral magnification of the second lens group G2,
β3: the lateral magnification of the third lens group G3,
Nd21: a refractive index for the "d" line of the first lens L21 of the second lens group G2,
Nd22: a refractive index for the "d" line of the second lens L22 of the second lens group G2,
Nd23: a refractive index for the "d" line of the third lens L23 of the second lens group G2,
G1Rr: the curvature radius of the surface of the most object side of the rear lens group G1R, and
f3: the focal length of the third lens group G3.

[Operation and Effect]

Next, the operation and effect of the imaging lens according to the present embodiment will be described.

In this imaging lens, the negative lens is disposed in the most object side, and the angle of incidence of off-axis light flux is lessened and light is incident on the second lens group G2 which is the focus lens group, so that it is possible to suppress the variation in an image surface by performing focusing. Further, the external form of the second lens group G2 can be small, so that the weight thereof can be lightened. Therefore, the imaging lens can be moved at high speed using a small actuator when focusing is performed.

Further, the rear lens group G1R having the positive refractive power is disposed on immediately after diaphragm St, so that the angle of light which is incident on the second lens group G2 which performs focusing can be reduced. Therefore, an image surface can be properly preserved from infinite to close photographing areas. Since the second lens group G2 is disposed immediately after the rear lens group G1R of the first lens group G1 and the external form of the lens is small, the weight thereof is light and second lens group G2 can be moved at high speed using a small actuator. Therefore, a focusing lens group can be moved at high speed while the size of a barrel is maintained to be compact by using the second lens group G2 as a focusing lens group. Further, power is arranged in such a way that the second lens group G2 has positive refractive power and the third lens group G3 has negative refractive power, so that a ratio of the movement amount of the second lens group G2 to variation amount of an image surface position (focus sensitivity) can be increased when the second lens group G2 is moved in the optical axis direction. When the focus sensitivity increases, a focus stroke can be decreased, so that the whole length of the lens can be reduced.

Further, since the third lens group G3 includes the negative lens L31 and the positive lens L32 in order from the object side, off-axis aberrations, in particular, distortion and the curvature of the image surface can be corrected well.

Further, when the front lens group G1F of the first lens group G1 includes three lenses, that is, the first lens L11F, the second lens L12F, and the third lens L13F in order from the object side, the first lens L11F corresponds to a negative lens, the second lens L12F corresponds to a positive lens, the third lens L13F corresponds to a negative lens, and the second lens L12F and the third lens L13F configure a cemented lens. Therefore, the spherical aberration and the off-axis aberration, in particular, the frame aberration can be corrected well.

Further, when the front lens group G1F includes three lenses, that is, the first lens L11F, the second lens L12F, and the third lens L13F in order from the object side, the first lens L11F corresponds to a negative lens, the second lens L12F corresponds to a positive lens, and the third lens L13F corresponds to a positive lens. Therefore, the configuration in which the diaphragm St is interposed becomes symmetrical, so that the off-axis aberration, in particular, the distortion can be corrected well.

Conditional Equation (1) defines the focal length f1R of the rear lens group G1R of the first lens group G1 for the focal length "f" of the whole lens system. In a case where the focal length is below the range represented in Conditional Equation (1), the power of the rear lens group G1R is too strong, with the result that eccentricity sensitivity is large, so that the difficulty level of production rises. In a case where the focal length is above the range represented in Conditional Equation (1), the power of the rear lens group G1R is too weak, with the result that the angle of peripheral light which is incident on the focusing lens group is not small, so that the variation in the image surface is large when close-up photographing is performed.

It is preferable that the numerical range of Conditional Equation (1) be set to the numerical range of the following Conditional Equation (1)'.

$$1.1 < f1R/f < 4 \tag{1}'$$

Further, it is preferable that the numerical range of Conditional Equation (1) be set to the numerical range of the following Conditional Equation (1)". When the numerical range of Conditional Equation (1) is set to the numerical range of Conditional Equation (1)", the variation in the image surface can be suppressed when the close-up photographing is performed while suppressing the eccentricity sensitivity.

$$1.2 < f1R/f < 3.5 \tag{1}''$$

Conditional Equation (2) defines the lateral magnification of the second lens group G2. In a case where the lateral magnification is below the range represented in Conditional Equation (2), the power of the second lens group G2 is too strong, with the result that eccentricity sensitivity is large, so that the difficulty level of production rises. In a case where the lateral magnification is above the range represented in Conditional Equation (2), the focus sensitivity decreases and a focus stroke increases, so that the whole length of the lens increases.

It is preferable that the numerical range of Conditional Equation (2) be set to the numerical range of the following Conditional Equation (2)'.

$$0.2 < \beta 2 < 0.6 \tag{2}'$$

Further, it is preferable that the numerical range of Conditional Equation (2) be set to the numerical range of the following Conditional Equation (2)". When the numerical range of Conditional Equation (2) is set to the numerical range of Conditional Equation (2)", the whole length of the lens can be reduced while suppressing the eccentricity sensitivity.

$$0.25 < \beta 2 < 0.55 \tag{2}''$$

Conditional Equation (3) defines the lateral magnification of the third lens group G3. In a case where the lateral magnification is below the range represented in Conditional Equation (3), the focus sensitivity decreases, with the result that a focus stroke increases, so that the whole length of the lens increases. In a case where the lateral magnification is above the range represented in Conditional Equation (3), the power of the third lens group G3 becomes too strong, with the result that eccentricity sensitivity increases, so that the difficulty level of production rises.

It is preferable that the numerical range of Conditional Equation (3) be set to the numerical range of the following Conditional Equation (3)'.

$$1.7 < \beta 3 < 2.5 \quad (3)'$$

Further, it is preferable that the numerical range of Conditional Equation (3) be set to the numerical range of the following Conditional Equation (3)". When the numerical range of Conditional Equation (3) is set to the numerical range of Conditional Equation (3)", the whole length of the lens can be reduced while suppressing the eccentricity sensitivity.

$$1.8 < \beta 3 < 2.4 \quad (3)''$$

Conditional Equation (4) defines a refractive index for the "d" line of the medium of the first lens L21 having negative refractive power in the second lens group G2. Conditional Equations (5) and (6) respectively define refractive indexes for the "d" lines of the media of the second lens L22 and the third lens L23 each having positive refractive power in the second lens group G2. In a case where the refractive index is above each of the ranges represented in Conditional Equation (4), (5), and (6), the weight of the medium increases and the weight of the lens becomes heavy, with the result that the size of the actuator used to move the focusing lens group is increased, so that the size of the barrel is increased.

Conditional Equation (7) defines the curvature radius G1Rr of the surface of the most object side of the rear lens group G1R for the focal length "f" of the whole lens system. In a case where the curvature radius is below the range represented in Conditional Equation (7), the difference in the angle of deviation of the upper and lower side light which is incident on the rear lens group G1R is increased, with the result that it is difficult to correct occurring frame aberration, so that the variation in the image surface, which occurs when focusing is performed in association with the difficulty, is increased. In a case where the curvature radius is above the range represented in Conditional Equation (7), the curvature of the image surface is deteriorated when, in particular, the close-up photographing is performed as it is difficult for the off-axis light flux to receive the refraction effect in the rear lens group G1R.

It is preferable that the numerical range of Conditional Equation (7) be set to the numerical range of the following Conditional Equation (7)'.

$$-4 < G1Rr/f < -0.8 \quad (7)'$$

Further, it is preferable that the numerical range of Conditional Equation (7) be set to the numerical range of the following Conditional Equation (7)". When the numerical range of Conditional Equation (7) is set to the numerical range of Conditional Equation (7)", the curvature of the image surface can be maintained well when the close-up photographing is performed while suppressing the occurrence of the frame aberration.

$$-2.5 < G1Rr/f < -0.8 \quad (7)''$$

Conditional Equation (8) defines the focal length f3 of the third lens group G3 for the focal length "f" of the whole lens system. In a case where the focal length is below the range represented in Conditional Equation (8), the refraction effect received by the third lens group G3 becomes weak, with the result that back-focus is increased, so that the whole length of the lens is increased as the result. In a case where the focal length is above the range represented in Conditional Equation (8), the power of the third lens group G3 is too strong, so that it is difficult to correct the spherical aberration.

It is preferable that the numerical range of Conditional Equation (8) be set to the numerical range of the following Conditional Equation (8)'.

$$-1.2 < f3/f < -0.6 \quad (8)'$$

Further, it is preferable that the numerical range of Conditional Equation (8) be set to the numerical range of the following Conditional Equation (8)". When the numerical range of Conditional Equation (8) is set to the numerical range of Conditional Equation (8)", the spherical aberration can be corrected well while reducing the whole length of the lens.

$$-1.1 < f3/f < -0.6 \quad (8)''$$

According to the above-described present embodiment, it is possible to implement an imaging lens which is compact, can perform focusing at high speed, and has high image formation performance.

[Application Example of Imaging Apparatus]

Figure 16:
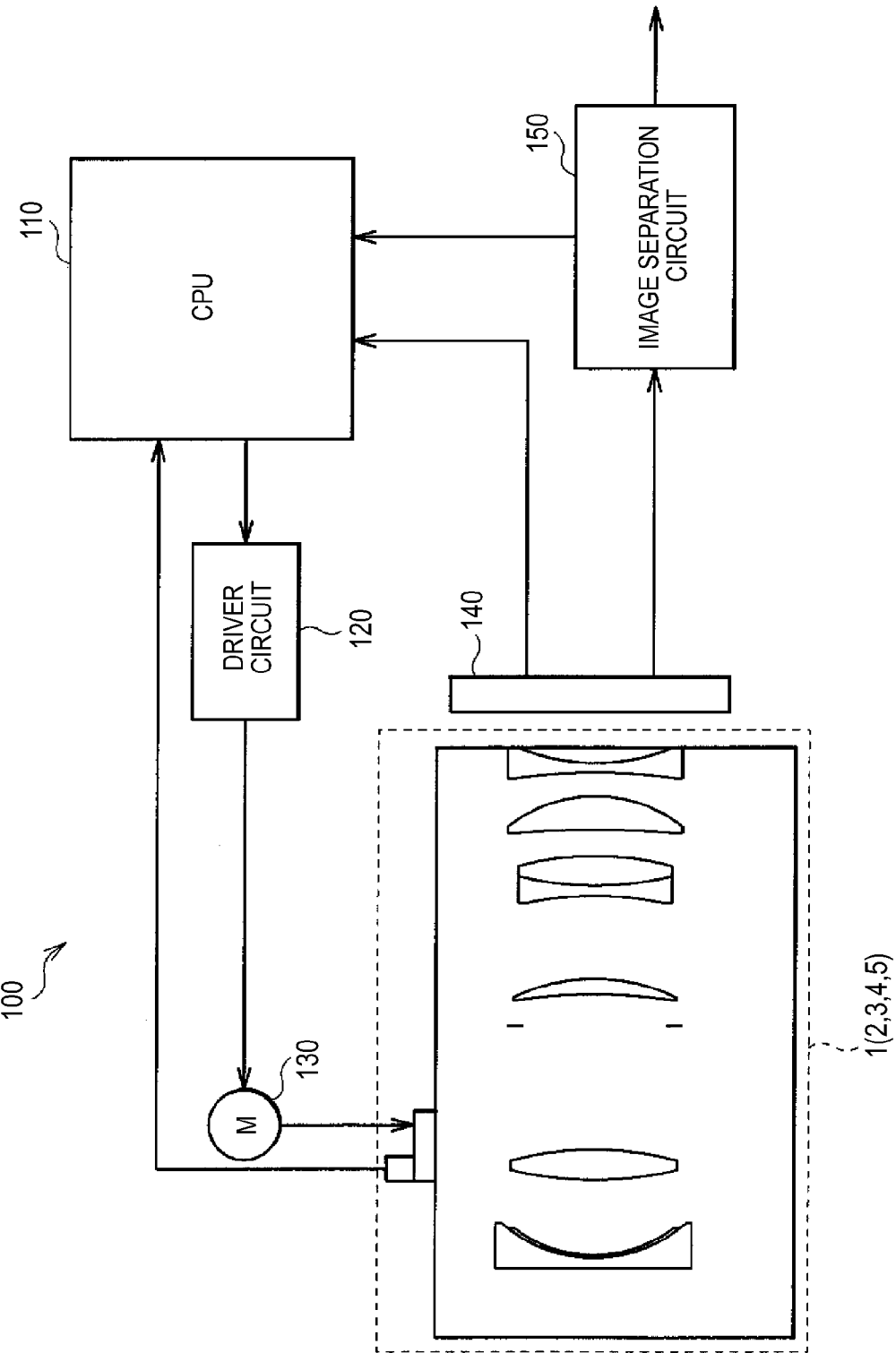
FIG. 16 is a block diagram illustrating a configuration example of an imaging apparatus.

FIG. 16 illustrates a configuration example of an imaging apparatus 100 to which the imaging lens according to the present embodiment is applied. The imaging apparatus 100 is, for example, a digital still camera. A Central Processing Unit (CPU) 110 performs integral control of the whole imaging apparatus 100. An optical image obtained using the above-described imaging lens 1 (2, 3, 4, or 5) is converted into an electrical signal using an imaging device 140, and the electrical signal is transmitted to an image separation circuit 150. Here, a photoelectric conversion device, for example, a Charge Coupled Device (CCD), a Complementary Metal-Oxide Semiconductor (CMOS), or the like is used as the imaging device 140. The image separation circuit 150 generates a focus control signal based on the electrical signal, transmits the focus control signal to the CPU 110, and, at the same time, transmits an image signal corresponding to the image part of the electrical signal to an image processing circuit (not shown) at a latter stage. In the image processing circuit, the format of the corresponding signal is converted into a signal format which is suitable for a subsequent process, and then provided for an image display process for a display unit, a recording process for a predetermined recording medium, a data transmission process via a predetermined communication interface, or the like.

The CPU 110 receives an operational signal, such as a focusing operational signal or the like, from the outside and performs various types of processes in response to the operational signal. When, for example, the focusing operational signal is supplied using a focusing button, the CPU 110 normalizes focusing according to the instruction, and operates a driving motor 130 via a driver circuit 120. Therefore, the CPU 110 of the imaging apparatus 100 moves the focus lens group (the second lens group G2) of the imaging lens 1 along the optical axis in response to the focusing operational signal. Meanwhile, the CPU 110 of the imaging apparatus 100 feedbacks information about the position of the focus lens group at that time, and then refers to the information when moving the focus lens group using the driving motor 130.

That is, although only one system is shown as a drive system in this imaging apparatus 100 in order to simplify explanation, a zoom system, a focus system, a photographing mode switching system, and the like may be individually provided. Further, when a camera shake correction function is provided, a vibration control drive system may be provided in order to drive a shake correction lens (group). Further, some of the above-described drive systems can be commonly used.

Further, although the case where a digital still camera is used as the specific object of the imaging apparatus 100 has been described in the above-described embodiment, the embodiment of the present disclosure is not limited thereto and other various types of electronic devices may be used as the specific object of the imaging apparatus 100. For example, other various types of electronic device, such as an interchangeable lens camera, a digital video camera, a mobile phone equipped with a digital video camera, a Personal Digital Assistant (PDA) and the like may be used as the detailed objects of the imaging apparatus 100.

EMBODIMENT

Next, specific numerical embodiments of the imaging lens according to the present embodiment will be described.

First Numerical Embodiment

Table 1 to Table 3 show specific lens data corresponding to the imaging lens 1 according to the first configuration example shown in FIG. 1. In particular, the basic lens data thereof is shown in Table 1, and the other data is shown in Table 2 and Table 3.

The surface number of the lens data shown in Table 1 represents the number of an i-th surface to which reference symbols are assigned in such a way that the surface of a component in the most object side is designated as a first surface and then the reference symbols sequentially increase toward the image side in the imaging lens 1. "Ri" corresponds to reference symbol "Ri" assigned in FIG. 1, and represents the curvature radius value (mm) of an i-th surface from the object side. In the same manner, "Di" represents the gap (mm) between the i-th surface and an (i+1)-th surface on the optical axis from the object side. "Ndj" represents a refractive index value for the "d" line (587.6 nm) of a j-th optical device from the object side. In the field of "vdj", the value of the Abbe number for the "d" line of the j-th optical device from the object side is shown.

In the imaging lens 1, since the second lens group G2 is moved when focusing is performed, the values of the front and back surface separations D8 and D13 of the second lens group G2 are variable. The data of the variable surface separations D8 and D13 are shown in Table 3. Meanwhile, "Fno." represents F-number, "f" represents the focal length of the whole lens system, "ω" represents a half angle, and "β" represents photographing magnitude in Table 3.

"STO" in Table 1 represents a diaphragm surface. A surface indicated using "ASP" is aspheric. An aspheric shape corresponds to a shape expressed using the following Equation. The aspheric curvature radius of the lens data of Table 1 represents the numerical value of a curvature radius in the vicinity of the optical axis (paraxial). The data of aspheric coefficients are shown in Table 3. In the numerical values shown in Table 3, reference symbol "E" represents that the subsequent numerical value thereof is an "exponent" based on 10, and that the numerical value expressed using an exponential function based on 10 is multiplied by the numerical value before "E". For example, "1.0E-05" represents "1.0× $10^{-5}$".

$$x = \frac{y^2 \cdot c^2}{1 + \sqrt{(1-(1+K)\cdot y^2 \cdot c^2)}} + \Sigma Ai \cdot Yi \quad \text{Expression 1}$$

wherein x: length in the optical axis direction from the apex of the lens surface, y: height in the direction which is perpendicular to the optical axis, c: paraxial curvature at the apex of lens, K: Korenich constant, and Ai: i-th order aspheric coefficient In the imaging lens 1, the front lens group G1F of the first lens group G1 includes two lenses, that is, the first lens L11F and the second lens L12F in order from the object side. In detail, the first lens L11F includes a negative meniscus lens facing the convex surface to the object side and having a composite aspheric surface L10 in the image side. The second lens L12F includes a biconvex lens. The rear lens group G1R includes the positive meniscus lens L11R facing the concave surface to the object side. The second lens group G2 includes the first lens L21 having negative refractive power, the second lens L22 having positive refractive power, and the third lens L23 having positive refractive power in the order from the object side. The first lens L21 includes a biconcave lens in which an aspheric surface is formed in the object side, and the second lens L22 includes a biconvex lens. The first lens L21 and the second lens L22 configure the cemented lens. The third lens L23 includes a positive meniscus lens in which aspheric surfaces are formed on both surface thereof. The third lens group G3 includes a biconcave negative lens L31. Images can be shifted by moving the whole third lens group G3 in the direction which is perpendicular to the optical axis Z1.

TABLE 1

Embodiment 1

| Surface No. | Ri | Di | Ndj | vdj |
| --- | --- | --- | --- | --- |
| 1 | 595.800 | 1.000 | 1.589129 | 61.2526 |
| 2 | 12.577 | 0.100 | 1.514601 | 50 |
| 3(ASP) | 10.519 | 6.900 | | |
| 4 | 32.108 | 2.661 | 1.56384 | 60.8301 |
| 5 | −32.113 | 11.184 | | |
| 6(STO) | — | 2.874 | | |
| 7 | −41.267 | 1.369 | 1.620409 | 60.3438 |
| 8 | −16.228 | D8 | | |
| 9(ASP) | −44.706 | 1.000 | 1.68893 | 31.1605 |
| 10 | 27.570 | 2.570 | 1.487489 | 70.4412 |
| 11 | −25.823 | 2.393 | | |
| 12(ASP) | −50.093 | 3.060 | 1.58913 | 61.2509 |
| 13(ASP) | −11.475 | D13 | | |
| 14 | −55.765 | 1.000 | 1.516798 | 64.1983 |
| 15 | 18.163 | 29.382 | | |

TABLE 2

| | | Embodiment 1 | | | |
|---|---|---|---|---|---|
| Surface No. | K | A4 | A6 | A8 | A10 |
| 3 | 0.00000 | −3.08003E−05 | −4.56027E−07 | −1.81763E−09 | −3.80728E−11 |
| 9 | 0.00000 | −1.90998E−04 | −8.56603E−07 | −7.77291E−09 | −1.44335E−10 |
| 12 | 0.00000 | 5.59391E−05 | 0.00000E+00 | 0.00000E+00 | 0.00000E+00 |
| 13 | 0.00000 | 3.04716E−05 | 1.15120E−07 | −1.47648E−09 | 3.38497E−11 |

TABLE 3

| | Embodiment 1 | |
|---|---|---|
| | Infinite focusing | Focusing at close range |
| Fno. | 3.59 | 4.61 |
| f | 29.26 | 17.97 |
| ω | 25.46 | 25.26 |
| β | 0.000 | −1.000 |
| D8 | 7.508 | 0.702 |
| D13 | 2.000 | 8.806 |

Second Numerical Embodiment

Figure 2:
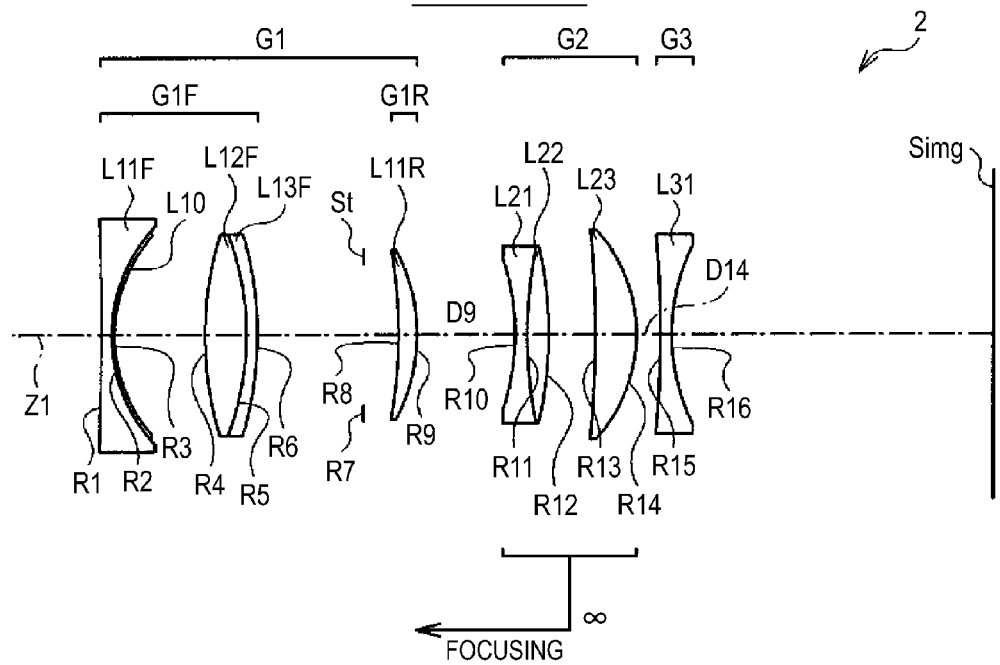
FIG. 2 is a cross-sectional view illustrating a second configuration example of the imaging lens, and illustrating a lens corresponding to a second numerical embodiment.

In the same manner as in the above-described first numerical embodiment, specific lens data corresponding to the configuration of the imaging lens 2 according to the second configuration example shown in FIG. 2 is shown in Table 4 to Table 6 as a second numerical embodiment.

In the imaging lens 2, the front lens group G1F of the first lens group G1 includes three lenses in order from the object side, that is, the first lens L11F, the second lens L12F, and the third lens L13F. In detail, the first lens L11F includes a biconcave lens having a composite aspheric surface L10 in the image side. The second lens L12F includes a biconvex lens, and the third lens L13F includes a negative meniscus lens.

TABLE 4

| | Embodiment 2 | | | |
|---|---|---|---|---|
| Surface No. | Ri | Di | Ndj | vdj |
| 1 | −692.788 | 1.000 | 1.589129 | 61.2526 |
| 2 | 14.055 | 0.100 | 1.514601 | 50 |
| 3(ASP) | 12.361 | 7.761 | | |
| 4 | 34.597 | 3.413 | 1.589129 | 61.2526 |
| 5 | −23.756 | 1.000 | 1.696802 | 55.4597 |
| 6 | −30.000 | 8.830 | | |
| 7(STO) | — | 2.970 | | |
| 8 | −33.470 | 1.500 | 1.487489 | 70.4412 |
| 9 | −15.803 | D9 | | |
| 10(ASP) | −29.448 | 1.000 | 1.68893 | 31.1605 |
| 11 | 32.713 | 1.825 | 1.696802 | 55.4597 |
| 12 | −35.067 | 3.959 | | |
| 13(ASP) | −83.606 | 3.400 | 1.618806 | 63.8554 |
| 14(ASP) | −12.751 | D14 | | |
| 15 | −84.353 | 1.000 | 1.516798 | 64.1983 |
| 16 | 17.665 | 26.983 | | |

TABLE 5

| | | Embodiment 2 | | | |
|---|---|---|---|---|---|
| Surface No. | K | A4 | A6 | A8 | A10 |
| 3 | 0.00000 | −2.69256E−08 | −1.80232E−07 | 7.28264E−10 | −1.75908E−11 |
| 10 | 0.00000 | −1.22623E−04 | −6.45697E−07 | −7.40108E−10 | −9.89539E−11 |
| 13 | 0.00000 | 1.21959E−05 | 0.00000E+00 | 0.00000E+00 | 0.00000E+00 |
| 14 | 0.00000 | 3.00836E−05 | 6.79280E−08 | −8.43350E−11 | 9.51819E−12 |

The second lens L12F and the third lens L13F configure a cemented lens. The rear lens group G1R includes the positive meniscus lens L11R facing the concave surface to the object side. The second lens group G2 includes the first lens L21 having negative refractive power, the second lens L22 having positive refractive power, and the third lens L23 having positive refractive power in order from the object side. The first lens L21 includes a biconcave lens having an aspheric surface formed in the object side, and the second lens L22 includes a biconvex lens. The first lens L21 and the second lens L22 configure a cemented lens. The third lens L23 includes a positive meniscus lens having aspheric surfaces formed in both surfaces thereof. The third lens group G3 includes the biconcave negative lens L31. Images can be shifted by moving the whole third lens group G3 in the direction which is perpendicular to the optical axis Z1.

TABLE 6

| | Embodiment 2 | |
|---|---|---|
| | Infinite focusing | Focusing at close range |
| Fno. | 3.56 | 3.71 |
| f | 29.17 | 17.76 |
| ω | 25.50 | 25.46 |
| β | 0.000 | −1.000 |
| D9 | 8.259 | 0.610 |
| D14 | 2.000 | 9.649 |

Third Numerical Embodiment

In the same manner, specific lens data corresponding to the configuration of the imaging lens 3 according to the third configuration example shown in FIG. 3 is shown in Table 7 to Table 9 as a third numerical embodiment.

In the imaging lens 2, the front lens group G1F of the first lens group G1 includes three lenses in order from the object side, that is, the first lens L11F, the second lens L12F, and the third lens L13F. In detail, the first lens L11F includes a negative meniscus lens having a composite aspheric surface L10 in the image side. The second lens L12F includes a biconvex lens, and the third lens L13F includes a positive meniscus lens facing the concave surface to the object side. The rear lens group G1R includes the positive meniscus lens L11R facing the concave surface to the object side. The second lens group G2 includes the first lens L21 having negative refractive power, the second lens L22 having positive refractive power, and the third lens L23 having positive refractive power in order from the object side. The first lens L21 includes a biconcave lens having an aspheric surface is formed in the object side, and the second lens L22 includes a biconvex lens. The first lens L21 and the second lens L22 configure a cemented lens. The third lens L23 includes a positive meniscus lens having aspheric surfaces formed in both surfaces thereof. The third lens group G3 includes a biconcave negative lens L31. Images can be shifted by moving the whole third lens group G3 in the direction which is perpendicular to the optical axis Z1.

TABLE 7

Embodiment 3

| Surface No. | Ri | Di | Ndj | vdj |
|---|---|---|---|---|
| 1 | 200.176 | 1.000 | 1.589129 | 61.2526 |
| 2 | 12.051 | 0.100 | 1.514601 | 50 |
| 3(ASP) | 10.246 | 6.664 | | |
| 4 | 34.872 | 1.876 | 1.568829 | 56.0441 |
| 5 | −30.950 | 8.201 | | |
| 6 | −17.088 | 1.842 | 1.487489 | 70.4412 |
| 7 | −14.676 | 1.500 | | |
| 8(STO) | — | 2.922 | | |
| 9 | −37.062 | 1.363 | 1.487489 | 70.4412 |
| 10 | −15.533 | D10 | | |
| 11(ASP) | −35.335 | 1.000 | 1.68893 | 31.1605 |
| 12 | 26.785 | 2.661 | 1.487489 | 70.4412 |
| 13 | −23.843 | 2.000 | | |
| 14(ASP) | −37.124 | 2.858 | 1.72903 | 54.0413 |
| 15(ASP) | −11.644 | D15 | | |
| 16 | −77.766 | 1.000 | 1.620409 | 60.3438 |
| 17 | 19.790 | 31.108 | | |

TABLE 8

Embodiment 3

| Surface No. | K | A4 | A6 | A8 | A10 |
|---|---|---|---|---|---|
| 3 | 0.00000 | −2.15133E−05 | −3.53627E−07 | −3.09607E−09 | −3.26459E−11 |
| 11 | 0.00000 | −2.46661E−04 | −1.26285E−06 | −8.31259E−09 | −2.53475E−10 |
| 14 | 0.00000 | 6.92277E−05 | 0.00000E+00 | 0.00000E+00 | 0.00000E+00 |
| 15 | 0.00000 | 3.13737E−05 | 1.05083E−07 | −1.23740E−09 | 3.70071E−11 |

TABLE 9

Embodiment 3

| | Infinite focusing | Focusing at close range |
|---|---|---|
| Fno. | 3.59 | 4.53 |
| f | 29.38 | 18.20 |
| ω | 25.59 | 25.48 |
| β | 0.000 | −1.000 |

TABLE 9-continued

Embodiment 3

| | Infinite focusing | Focusing at close range |
|---|---|---|
| D10 | 6.904 | 0.802 |
| D15 | 2.000 | 8.102 |

Fourth Numerical Embodiment

In the same manner, specific lens data corresponding to the configuration of the imaging lens 4 according to the fourth configuration example shown in FIG. 4 is shown in Table 10 to Table 12 as a fourth numerical embodiment.

In the imaging lens 4, the front lens group G1F of the first lens group G1 includes two lenses in order from the object side, that is, the first lens L11F and the second lens L12F. In detail, the first lens L11F includes a negative meniscus lens facing a convex surface to the object side and having a composite aspheric surface L10 in the image side. The second lens L12F includes a biconvex lens. The rear lens group G1R includes the positive meniscus lens L11R facing a concave surface to the object side. The second lens group G2 includes the first lens L21 having negative refractive power, the second lens L22 having positive refractive power, and the third lens L23 having positive refractive power in order from the object side. The first lens L21 includes a biconcave lens having an aspheric surface in the object side, and the second lens L22 includes a biconvex lens. The first lens L21 and the second lens L22 configure a cemented lens. The third lens L23 includes a positive meniscus lens having aspheric surfaces formed on both surfaces thereof. The third lens group G3 includes two lenses in order from the object side, that is, the negative lens L31 and the positive lens L32. The negative lens L31 includes a biconcave lens, and the positive lens L32 includes a positive meniscus lens facing the convex surface to the object side. Images can be shifted by moving the whole third lens group G3 or the negative lens L31 of the third lens group G3 in the direction which is perpendicular to the optical axis Z1.

TABLE 10

Embodiment 4

| Surface No. | Ri | Di | Ndj | vdj |
|---|---|---|---|---|
| 1 | 56.474 | 1.000 | 1.589129 | 61.2526 |
| 2 | 13.466 | 0.100 | 1.514601 | 50 |
| 3(ASP) | 12.057 | 13.300 | | |
| 4 | 26.110 | 2.897 | 1.487489 | 70.4412 |

TABLE 10-continued

Embodiment 4

| Surface No. | Ri | Di | Ndj | vdj |
|---|---|---|---|---|
| 5 | −32.611 | 7.827 | | |
| 6(STO) | — | 2.854 | | |
| 7 | −38.102 | 1.500 | 1.487489 | 70.4412 |
| 8 | −19.349 | D8 | | |
| 9(ASP) | −30.455 | 0.900 | 1.68893 | 31.1605 |
| 10 | 36.077 | 1.916 | 1.72916 | 54.6735 |
| 11 | −25.327 | 4.000 | | |
| 12(ASP) | −31.090 | 3.163 | 1.618806 | 63.8554 |
| 13(ASP) | −11.773 | D13 | | |
| 14 | −54.865 | 1.000 | 1.744002 | 44.72 |
| 15 | 18.506 | 4.928 | | |
| 16 | 22.140 | 3.475 | 1.7552 | 27.5305 |
| 17 | 29.323 | 15.500 | | |

TABLE 11

| Surface No. | K | A4 | A6 | A8 | A10 |
|---|---|---|---|---|---|
| 3 | 0.00000 | 5.58015E−06 | −9.04109E−08 | 6.62301E−10 | −1.29908E−11 |
| 9 | 0.00000 | −1.42080E−04 | −8.08307E−07 | 2.48767E−09 | −1.29873E−10 |
| 12 | 0.00000 | 4.86237E−05 | 0.00000E+00 | 0.00000E+00 | 0.00000E+00 |
| 13 | 0.00000 | 5.96610E−05 | 7.43400E−08 | 1.05054E−09 | 1.66826E−11 |

TABLE 12

Embodiment 4

| | Infinite focusing | Focusing at close range |
|---|---|---|
| Fno. | 3.60 | 3.82 |
| f | 29.43 | 16.45 |
| ω | 25.50 | 25.64 |
| β | 0.000 | −1.000 |
| D8 | 8.641 | 0.846 |
| D13 | 2.000 | 9.794 |

Fifth Numerical Embodiment

Figure 5:
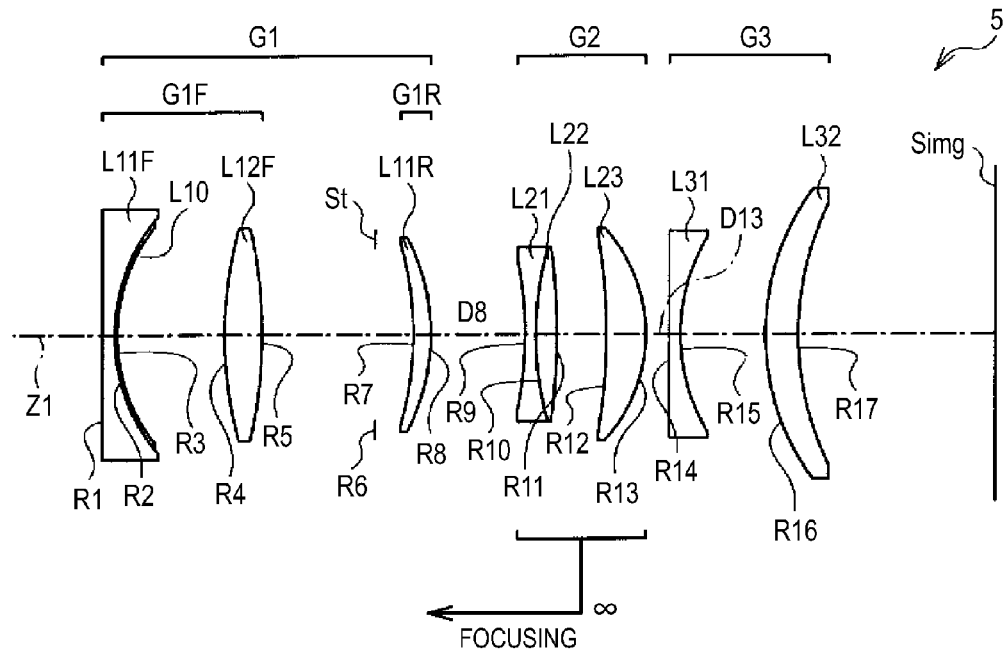
FIG. 5 is a cross-sectional view illustrating a fifth configuration example of the imaging lens, and illustrating a lens corresponding to a fifth numerical embodiment.

In the same manner, specific lens data corresponding to the configuration of the imaging lens 5 according to the fifth configuration example shown in FIG. 5 is shown in Table 13 to Table 15 as a fifth numerical embodiment.

In the imaging lens 5, the front lens group G1F of the first lens group G1 includes two lenses in order from the object side, that is, the first lens L11F and the second lens L12F. In detail, the first lens L11F includes a biconcave lens having a composite aspheric surface L10 in the image side. The second lens L12F includes a biconvex lens. The rear lens group G1R includes the positive meniscus lens L11R facing a concave surface to the object side. The second lens group G2 includes the first lens L21 having negative refractive power, the second lens L22 having positive refractive power, and the third lens L23 having positive refractive power in order from the object side. The first lens L21 includes a biconcave lens having an aspheric surface formed in the object side, and the second lens L22 includes a biconvex lens. The first lens L21 and the second lens L22 configure a cemented lens. The third lens L23 includes a positive meniscus lens having aspheric surfaces on both surfaces thereof. The third lens group G3 includes two lenses in order from the object side, that is, the negative lens L31 and the positive lens L32. The negative lens L31 includes a biconcave lens, and the positive lens L32 includes a positive meniscus lens facing a convex surface to the object side. Images can be shifted by moving the whole third lens group G3 or the negative lens L31 of the third lens group G3 in the direction which is perpendicular to the optical axis Z1.

TABLE 13

Embodiment 5

| Surface No. | Ri | Di | Ndj | vdj |
|---|---|---|---|---|
| 1 | −551.281 | 1.000 | 1.589129 | 61.2526 |
| 2 | 15.299 | 0.100 | 1.514601 | 50 |
| 3(ASP) | 13.814 | 9.144 | | |
| 4 | 33.877 | 3.187 | 1.60625 | 63.711 |
| 5 | −34.634 | 9.392 | | |
| 6(STO) | — | 3.220 | | |
| 7 | −28.312 | 1.500 | 1.487489 | 70.4412 |
| 8 | −16.894 | D8 | | |
| 9(ASP) | −49.715 | 1.000 | 1.68893 | 31.1605 |
| 10 | 28.234 | 1.773 | 1.72916 | 54.6735 |
| 11 | −39.007 | 4.000 | | |
| 12(ASP) | −42.577 | 3.400 | 1.618806 | 63.8554 |
| 13(ASP) | −12.135 | D13 | | |
| 14 | −971.269 | 1.000 | 1.744002 | 44.72 |
| 15 | 16.453 | 7.044 | | |
| 16 | 20.371 | 2.742 | 1.71736 | 29.5005 |
| 17 | 24.842 | 16.529 | | |

TABLE 14

Embodiment 5

| Surface No. | K | A4 | A6 | A8 | A10 |
|---|---|---|---|---|---|
| 3 | 0.00000 | 2.16591E−06 | −8.20370E−08 | 6.76584E−11 | −4.13455E−12 |
| 9 | 0.00000 | −1.27114E−04 | −6.04385E−07 | −2.09935E−09 | −9.70229E−11 |
| 12 | 0.00000 | 2.88606E−05 | 0.00000E+00 | 0.00000E+00 | 0.00000E+00 |
| 13 | 0.00000 | 4.65984E−05 | 4.36938E−08 | −2.69171E−10 | 1.55010E−11 |

TABLE 15

Embodiment 5

|  | Infinite focusing | Focusing at close range |
|---|---|---|
| Fno. | 2.88 | 3.67 |
| f | 29.17 | 17.49 |
| ω | 25.85 | 25.35 |
| β | 0.000 | −1.000 |
| D8 | 7.967 | 0.372 |
| D13 | 2.000 | 9.595 |

Other Numerical Value Data of Each Embodiment

In Table 16, values, which are related to each of the above-described Conditional Equation, are collected with respect to each numerical embodiment and shown. As understood from Table 16, with respect to each Conditional Equation, the values of each of the numerical embodiments fall within the numerical range thereof.

TABLE 16

| Conditional Equation | Embodiment 1 | Embodiment 2 | Embodiment 3 | Embodiment 4 | Embodiment 5 |
|---|---|---|---|---|---|
| (1) | 1.443 | 2.049 | 1.829 | 2.670 | 2.824 |
| (2) | 0.423 | 0.389 | 0.401 | 0.448 | 0.345 |
| (3) | 2.119 | 1.962 | 2.233 | 1.978 | 1.945 |
| (4) | 1.689 | 1.689 | 1.689 | 1.689 | 1.689 |
| (5) | 1.487 | 1.697 | 1.487 | 1.729 | 1.729 |
| (6) | 1.589 | 1.619 | 1.729 | 1.619 | 1.619 |
| (7) | −1.411 | −1.148 | −1.262 | −1.294 | −0.971 |
| (8) | −0.902 | −0.966 | −0.862 | −0.773 | −0.912 |

[Aberration Performance]

Figure 6A:
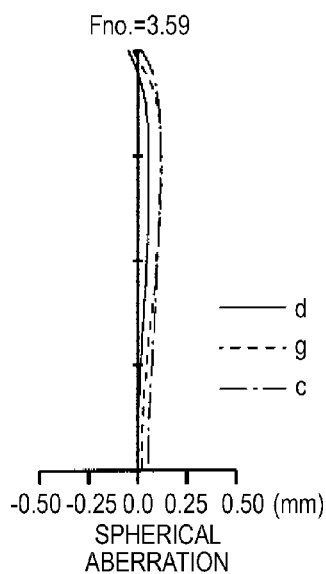
FIGS. 6A to 6C are aberration views illustrating aberrations when the imaging lens corresponding to the first numerical embodiment performs infinite focusing, and FIGS. 6A to 6C respectively illustrate spherical aberration, astigmatism, and distortion.
Figure 6B:
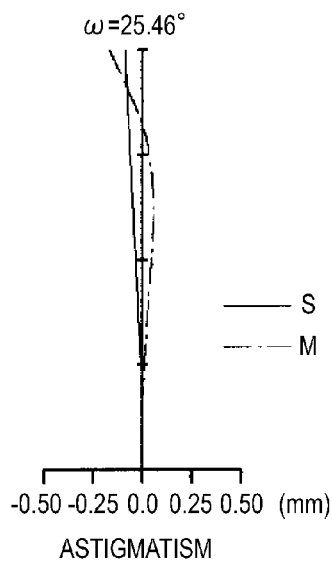
Figure 6C:
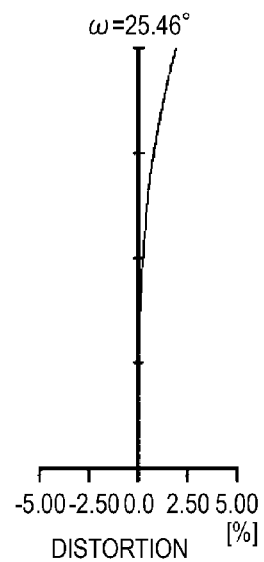
Figure 7A:
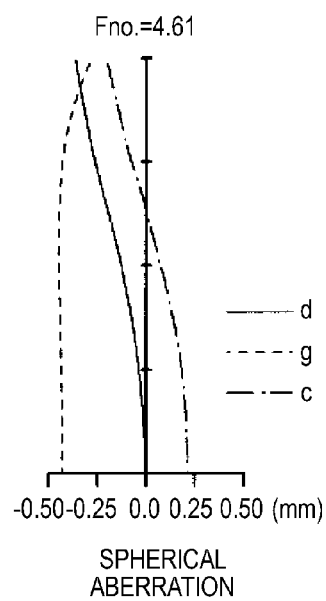
FIGS. 7A to 7C are aberration views illustrating aberrations when the imaging lens corresponding to the first numerical embodiment performs focusing at close range ($\beta=-1$), and FIGS. 7A to 7C respectively illustrate spherical aberration, astigmatism, and distortion.
Figure 7B:
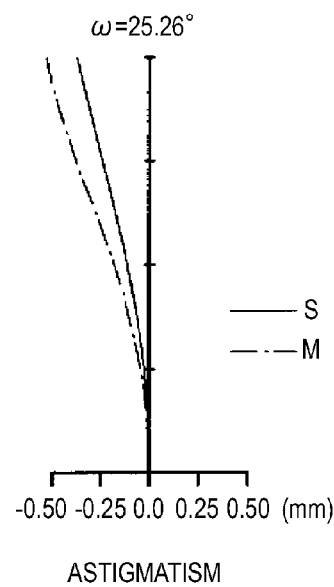
Figure 7C:
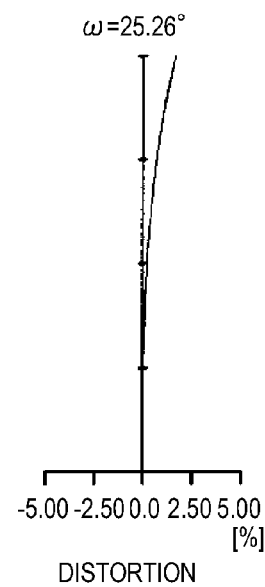
Figure 8A:
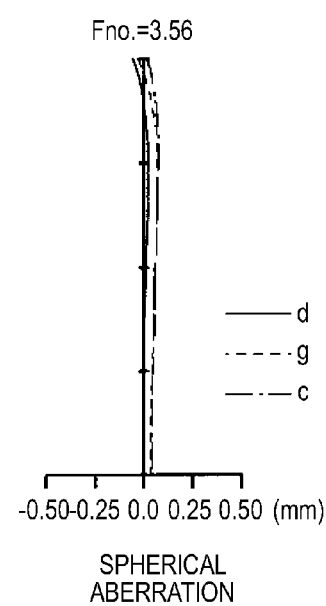
FIGS. 8A to 8C are aberration views illustrating aberrations when the imaging lens corresponding to the second numerical embodiment performs infinite focusing, and FIGS. 8A to 8C respectively illustrate spherical aberration, astigmatism, and distortion.
Figure 8B:
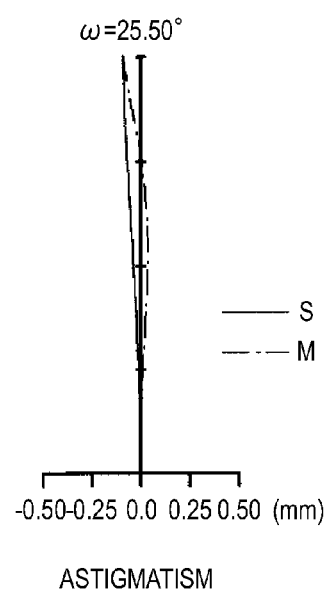
Figure 8C:
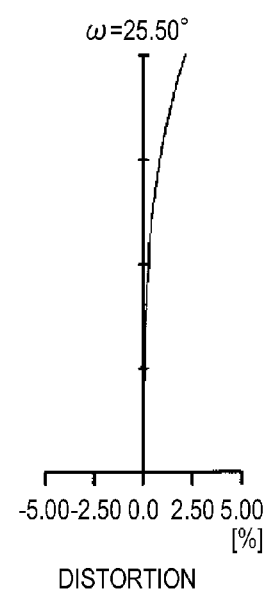
Figure 9A:
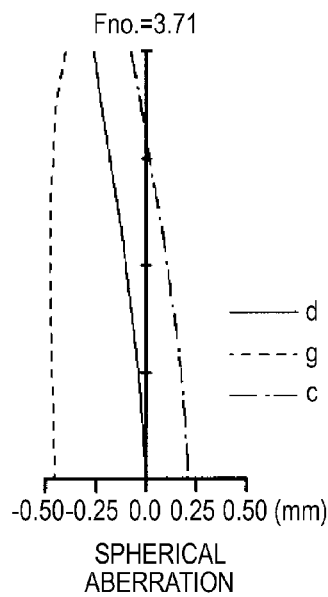
FIGS. 9A to 9C are aberration views illustrating aberrations when the imaging lens corresponding to the second numerical embodiment performs focusing at close range (β=−1), and FIGS. 9A to 9C respectively illustrate spherical aberration, astigmatism, and distortion.
Figure 9B:
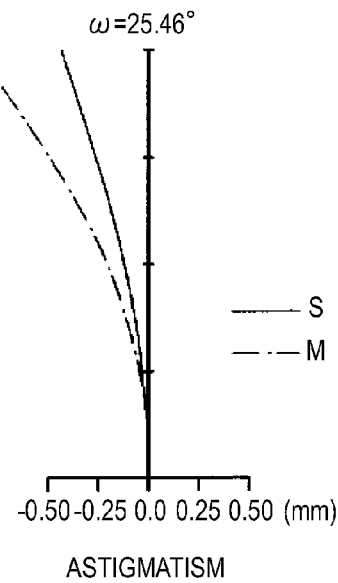
Figure 9C:
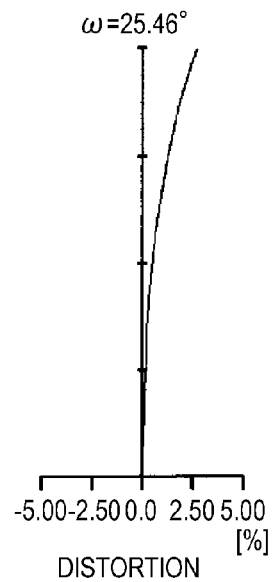
Figure 10A:
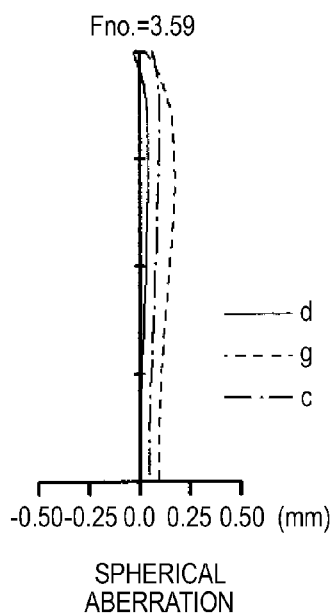
FIGS. 10A to 10C are aberration views illustrating aberrations when the imaging lens corresponding to the third numerical embodiment performs infinite focusing, and FIGS. 10A to 10C respectively illustrate spherical aberration, astigmatism, and distortion.
Figure 10B:
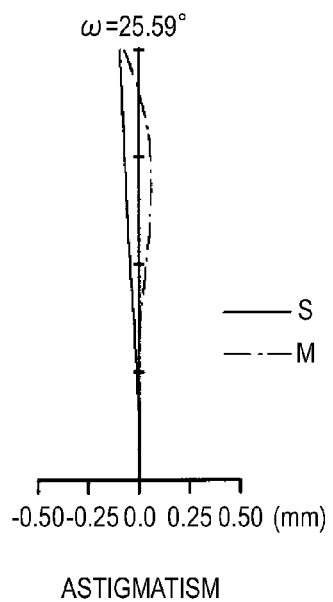
Figure 10C:
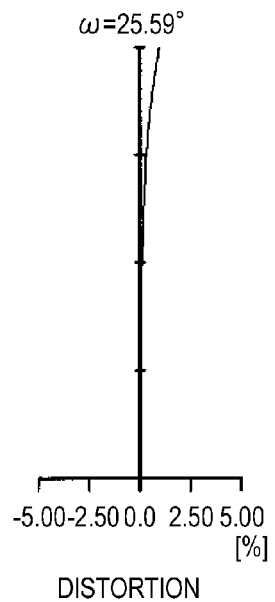
Figure 11A:
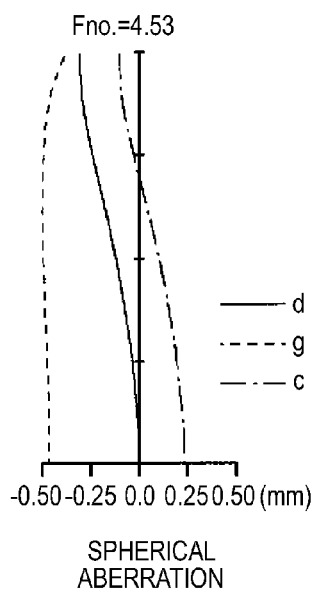
FIGS. 11A to 11C are aberration views illustrating aberrations when the imaging lens corresponding to the third numerical embodiment performs focusing at close range (β=−1), and FIGS. 11A to 11C respectively illustrate spherical aberration, astigmatism, and distortion.
Figure 11B:
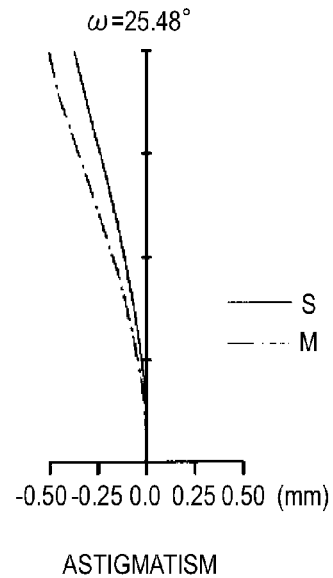
Figure 11C:
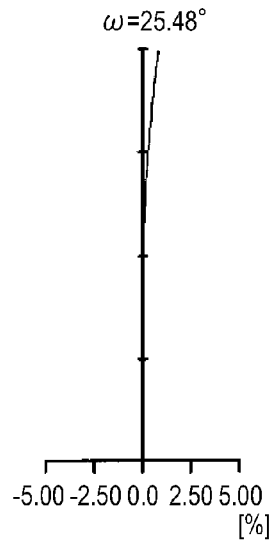
Figure 12A:
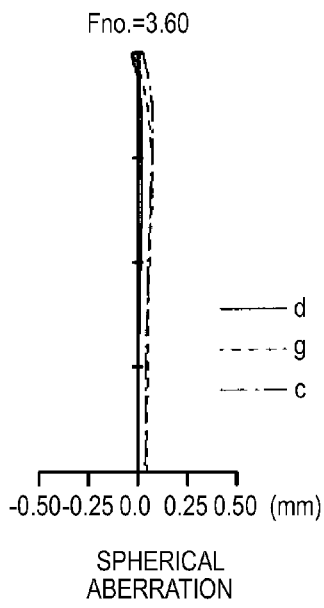
FIGS. 12A to 12C are aberration views illustrating aberrations when the imaging lens corresponding to the fourth numerical embodiment performs infinite focusing, and FIGS. 12A to 12C respectively illustrate spherical aberration, astigmatism, and distortion.
Figure 12B:
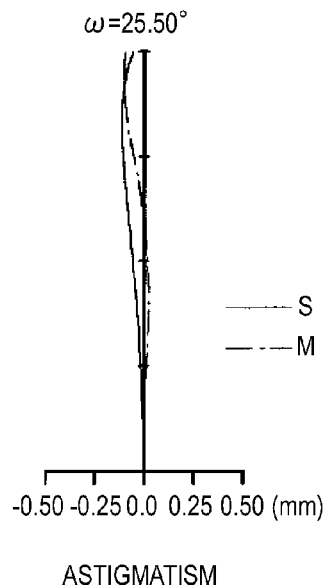
Figure 12C:
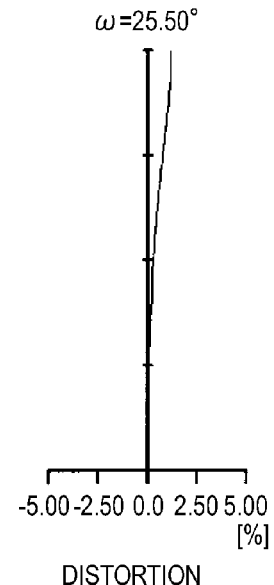
Figure 13A:
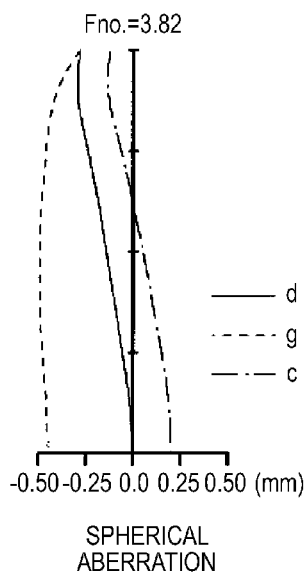
FIGS. 13A to 13C are aberration views illustrating aberrations when the imaging lens corresponding to the fourth numerical embodiment performs focusing at close range (β=−1), and FIGS. 13A to 13C respectively illustrate spherical aberration, astigmatism, and distortion.
Figure 13B:
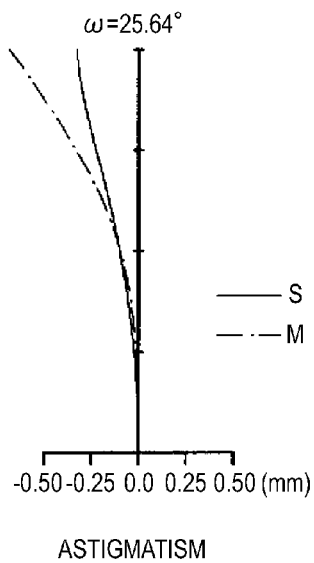
Figure 13C:
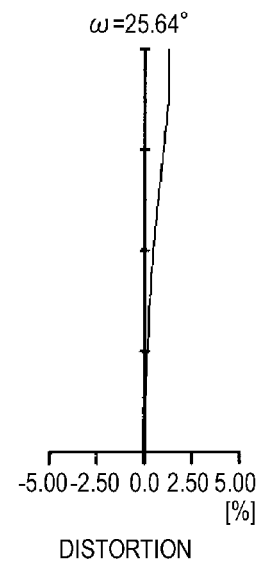
Figure 14A:
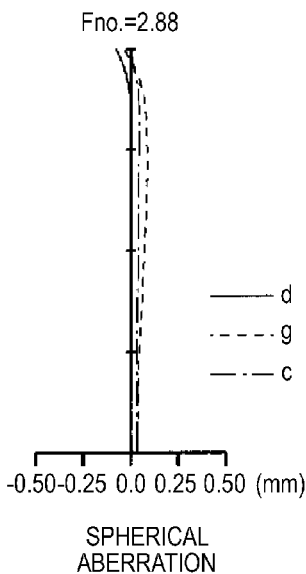
FIGS. 14A to 14C are aberration views illustrating aberrations when the imaging lens corresponding to the fifth numerical embodiment performs infinite focusing, and FIGS. 14A to 14C respectively illustrate spherical aberration, astigmatism, and distortion.
Figure 14B:
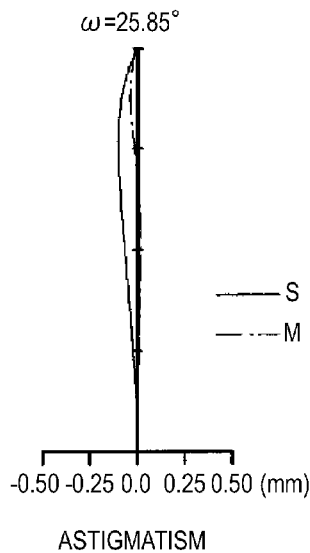
Figure 14C:
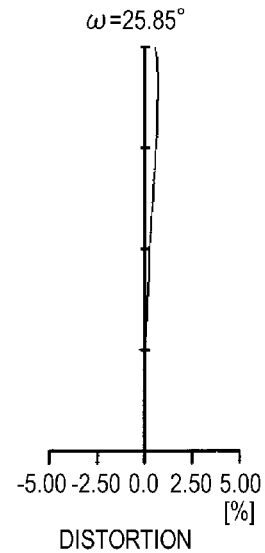
Figure 15A:
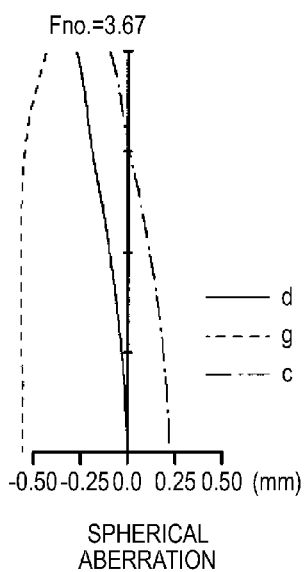
FIGS. 15A to 15C are aberration views illustrating aberrations when the imaging lens corresponding to the fifth numerical embodiment performs focusing at close range (β=−1), and FIGS. 15A to 15C respectively illustrate spherical aberration, astigmatism, and distortion.
Figure 15B:
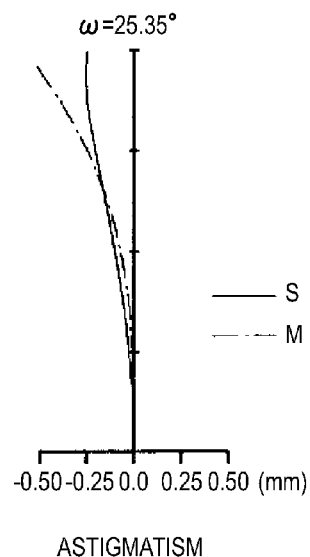
Figure 15C:
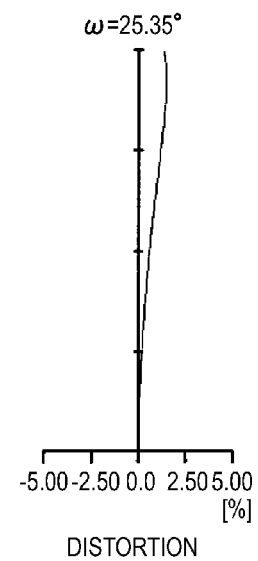

FIGS. 6A to 6C respectively illustrate spherical aberration, astigmatism, and distortion when the imaging lens 1 corresponding to the first numerical embodiment performs infinite focusing. FIGS. 7A to 7C respectively illustrate the aberrations when focusing is performed at close range in the same manner. Each aberration view shows aberration in which "d" line (587.6 nm) is set as the reference wavelength. Each spherical aberration view shows aberrations for "g" line (435.84 m) and "C" line (656.28 m). In the astigmatism view, the solid line represents aberration in the sagittal direction and dotted line represents aberration in the meridional direction. "Fno." represents an "F" value and "ω" represents half view angle.

In the same manner, the aberrations of the imaging lens 2 corresponding to the second numerical embodiment are shown in FIGS. 8A to 8C and FIGS. 9A to 9C. In the same manner, the aberrations of the imaging lenses 3 to 5 corresponding to the third to fifth numerical embodiments are shown in FIGS. 10A to 15C.

As understood from each of the above-described aberration views, each aberration is corrected in a proper balance when infinite focusing is performed and when focusing is performed at close range according to each embodiments.

As understood from each of the above-described numerical data and the aberration views, it is possible to implement an imaging lens which is compact, can perform focusing at high speed, and has high image formation performance.

Other Embodiments

The technology according to the embodiment of the present disclosure is not limited to the above-described description of the embodiments and examples, and various types of modifications are possible.

For example, although the configuration including the three lens groups have been described in the above-described embodiment, a lens which does not substantially have refractive power may be further provided.

Further, the present disclosure can be implemented as the following configurations.

(1) An imaging lens including a first lens group; a second lens group having positive refractive power; and a third lens group having negative refractive power, which are arranged in order from an object side; in which the first lens group includes a front lens group having a negative lens in a most object side, a diaphragm, and a rear lens group having positive refractive power; the second lens group includes a first lens having the negative refractive power, a second lens having the positive refractive power, and a third lens having the positive refractive power in an order from the object side; and, when focusing is performed, the second lens group is moved in an optical axis direction.

(2) The imaging lens of (1) satisfying the following Conditional Equation:

$$1 < f1R/f < 5 \quad (1)$$

wherein
f1R: a focal length of the rear lens group, and
f: a focal length of a whole lens system.

(3) The imaging lens of (1) or (2) satisfying the following Conditional Equation:

$$0.2 < \beta 2 < 0.7 \quad (2)$$

$$1.5 < \beta 3 < 3.1 \quad (3)$$

wherein
β2: lateral magnification of the second lens group, and
β3: lateral magnification of the third lens group.

(4) The imaging lens of any one of (1) to (3) satisfying the following Conditional Equation:

$$Nd21 < 1.7 \quad (4)$$

$$Nd22 < 1.75 \quad (5)$$

$$Nd23 < 1.75 \quad (6)$$

wherein
Nd21: a refractive index for "d" line of the first lens of the second lens group,
Nd22: a refractive index for "d" line of the second lens of the second lens group, and
Nd23: a refractive index for "d" line of the third lens of the second lens group (5) The imaging lens of any one of (1) to (4) satisfying the following Conditional Equation:

$$-10 < G1Rr/f < -0.7 \quad (7)$$

wherein
G1Rr: a curvature radius of a surface in the most object side of the rear lens group.

(6) The imaging lens of any one of (1) to (5) satisfying the following Conditional Equation:

$$-1.4 < f3/f < -0.5 \quad (8)$$

wherein
f3: a focal length of the third lens group.

(7) In the imaging lens of any one of (1) to (6), the third lens group includes a negative lens and a positive lens in order from the object side.

(8) In the imaging lens of any one of (1) to (7), the front lens group includes a first lens having the negative refractive power, a second lens having the positive refractive power, and a third lens having the negative refractive power in order form the object side; and the second lens and the third lens of the front lens group are bonded.

(9) In the imaging lens of any one of (1) to (7), the front lens group includes a first lens having the negative refractive power, a second lens having the positive refractive power, and a third lens having the positive refractive power in order from the object side. (10) The imaging lens of any one of (1) to (9) further including a lens which does not substantially have the refractive power.

The present disclosure contains subject matter related to that disclosed in Japanese Priority Patent Application JP 2011-127601 filed in the Japan Patent Office on Jun. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging lens comprising:
    a first lens group;
    a second lens group having positive refractive power; and
    a third lens group having negative refractive power, which are arranged in order from an object side to an image side,
    wherein the first lens group includes a front lens group having a negative lens and disposed at the object side, a rear lens group having positive refractive power and disposed at the image side, and a diaphragm disposed between the front lens group and the rear lens group,
    wherein the second lens group consists of a second lens group first lens having negative refractive power, a second lens group second lens having positive refractive power, and a second lens group third lens having positive refractive power in an order from the object side,
    wherein, when focusing is performed, the second lens group is moved in an optical axis direction while the first lens group and the third lens group remain in a fixed, stationary state,
    wherein the imaging lens satisfies following Conditional Equation:

$$1 < f1R/f < 5 \qquad (1)$$

wherein
    f1R: a focal length of the rear lens group, and
    f: a focal length of a whole lens system and
    wherein
    the front lens group includes at least a first front lens group lens and a second front lens group lens, the second front lens group lens includes a biconvex lens, the rear lens group includes a positive meniscus lens having a concave surface facing the object side,
    the second lens group first lens includes a biconcave lens having an aspheric surface formed on the object side and a second lens group second lens includes a biconvex lens with the second lens group first lens and the second lens group second lens configured as a cemented lens, the second lens group third lens includes a positive meniscus lens having aspheric surfaces formed on both surfaces thereof and
    the third lens group includes at least a biconcave lens.

2. The imaging lens according to claim 1, satisfying following Conditional Equation:

$$0.2 < \beta 2 < 0.7 \qquad (2)$$

$$1.5 < \beta 3 < 3.1 \qquad (3)$$

wherein
    β2: lateral magnification of the second lens group, and
    β3: lateral magnification of the third lens group.

3. The imaging lens according to claim 1, satisfying following Conditional Equation:

$$Nd21 < 1.7 \qquad (4)$$

$$Nd22 < 1.75 \qquad (5)$$

$$Nd23 < 1.75 \qquad (6)$$

wherein
    Nd21: a refractive index for "d" line of the first lens of the second lens group,
    Nd22: a refractive index for "d" line of the second lens of the second lens group, and
    Nd23: a refractive index for "d" line of the third lens of the second lens group.

4. The imaging lens according to claim 1, satisfying following Conditional Equation:

$$-10 < G1Rr/f < -0.7 \qquad (7)$$

wherein
    G1Rr: a curvature radius of a surface in a most object side of the rear lens group.

5. The imaging lens according to claim 1, satisfying following Conditional Equation:

$$-1.4 < f3/f < -0.5 \qquad (8)$$

wherein
    f3: a focal length of the third lens group.

6. The imaging lens according to claim 1,
    wherein the third lens group includes a negative lens and a positive lens in order from the object side.

7. The imaging lens according to claim 1,
    wherein the front lens group includes a first lens having negative refractive power, a second lens having positive refractive power, and a third lens having negative refractive power in order form the object side, and
    wherein the second lens and the third lens of the front lens group are bonded.

8. The imaging lens according to claim 1,
    wherein the front lens group includes a first lens having negative refractive power, a second lens having positive refractive power, and a third lens having positive refractive power in order from the object side.

9. An imaging apparatus comprising:
    an imaging lens; and
    an imaging device which outputs an imaging signal based on an optical image formed by the imaging lens,
    wherein the imaging lens includes a first lens group, a second lens group having positive refractive power, a third lens group having negative refractive power, which are arranged in order from an object side to an image side,
    wherein the first lens group includes a front lens group having a negative lens and disposed at the object side, a rear lens group having positive refractive power and disposed at the image side, and a diaphragm disposed between the front lens group and the rear lens group,
    wherein the second lens group consists of a second lens group first lens having negative refractive power, a second lens group second lens having positive refractive power, and a second lens group third lens having positive refractive power in order from the object side, wherein, when focusing is performed, the second lens group is moved in an optical axis direction while the first lens group and the third lens group remain in a fixed, stationary state, wherein the imaging lens satisfies following Conditional Equation:

$$1<f1R/f<5 \qquad (1)$$

wherein f1R: a focal length of the rear lens group, and f: a focal length of a whole lens system and wherein the front lens group includes at least a first front lens group lens and a second front lens group lens, the second front lens group lens includes a biconvex lens, the rear lens group includes a positive meniscus lens having a concave surface facing the object side, the second lens group first lens includes a biconcave lens having an aspheric surface formed on the object side and a second lens group second lens includes a biconvex lens with the second lens group first lens and the second lens group second lens configured as a cemented lens, the second lens group third lens includes a positive meniscus lens having aspheric surfaces formed on both surfaces thereof and the third lens group includes at least a biconcave lens.

10. The imaging lens according to claim 9, satisfying following Conditional Equation:

$$0.2<\beta2<0.7 \qquad (2)$$

$$1.5<\beta3<3.1 \qquad (3)$$

wherein

β2: lateral magnification of the second lens group, and

β3: lateral magnification of the third lens group.

11. The imaging lens according to claim 9, satisfying following Conditional Equation:

$$Nd21<1.7 \qquad (4)$$

$$Nd22<1.75 \qquad (5)$$

$$Nd23<1.75 \qquad (6)$$

wherein

Nd21: a refractive index for "d" line of the first lens of the second lens group, Nd22: a refractive index for "d" line of the second lens of the second lens group, and Nd23: a refractive index for "d" line of the third lens of the second lens group.

12. The imaging lens according to claim 9, satisfying following Conditional Equation:

$$-10<G1Rr/f<-0.7 \qquad (7)$$

wherein

G1Rr: a curvature radius of a surface in a most object side of the rear lens group.

\* \* \* \* \*